March 6, 1962        C. B. ESTES        3,023,665
MOTOR CONTROL FOR AUTOMATIC PHOTOGRAPHIC CAMERAS
Filed Aug. 31, 1959
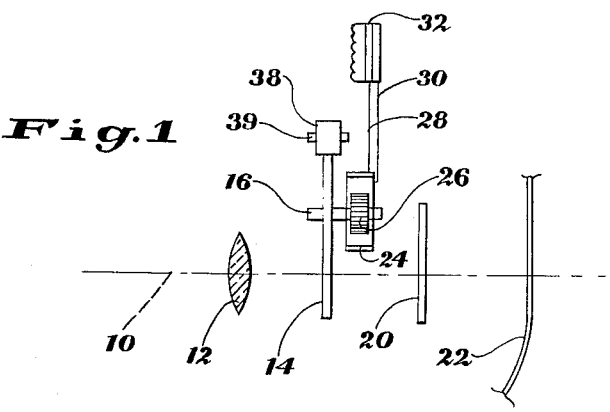
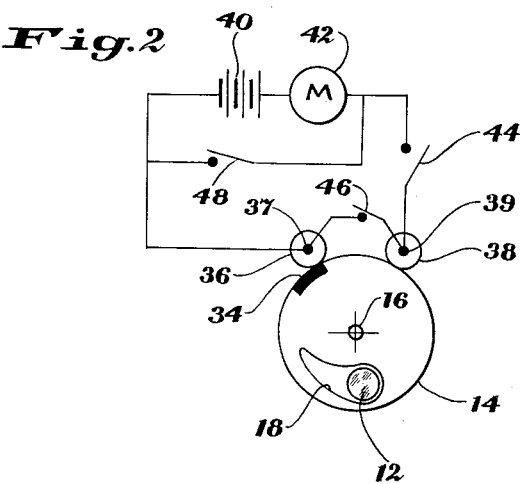
*Cameron B. Estes*
INVENTOR.
BY R. Frank Smith
Robert W. Hampton
ATTORNEYS

United States Patent Office 3,023,665
Patented Mar. 6, 1962

3,023,665
MOTOR CONTROL FOR AUTOMATIC PHOTOGRAPHIC CAMERAS
Cameron B. Estes, Rochester, N.Y., assignor to Eastman Kodak Company, Rochester, N.Y., a corporation of New Jersey
Filed Aug. 31, 1959, Ser. No. 837,016
6 Claims. (Cl. 88—16)

The present invention relates to photographic cameras having automatic exposure control systems, and more particularly relates to the disabling of driving motors in such cameras by the exposure control system during predetermined conditions of scene brightness.

It is convenient for the operator of a motion picture camera, which has an automatic exposure control system, to be warned when scene brightness drops below the range for which the camera is designed. Numerous devices have been proposed for presenting a low-light signal to the camera operator when scene brightness drops below the camera range. However, the operator cannot always be certain of seeing a visual signal, especially since such signals generally are illuminated by scene light, the intensity of which has diminished when the signal must be effective.

It is therefore a primary object of the present invention to automatically stop further operation of a motion picture camera in response to diminution of scene brightness below a predetermined range.

It is a more particular object of the invention to automatically open the circuit of an electric drive motor for a motion picture camera in response to diminution of scene brightness below a predetermined range. In conjunction with the foregoing object it is a further object to provide means for overriding the automatic circuit-opening structure, so that the camera motor may be operated regardless of scene brightness.

Other objects of the invention will appear from the following description, reference being made to the accompanying drawings, wherein:

FIG. 1 is a schematic right side view of the basic elements of a motion picture camera embodying the present invention; and FIG. 2 is a front view of an automatically controlled diaphragm vane and a schematic wiring diagram of a camera motor circuit controlled by the vane.

Referring to FIG. 1, a typical camera embodying the invention has a taking-lens axis 10 on which are arranged a taking-lens system indicated generally at 12, a diaphragm vane 14, a shutter 20 and a photosensitive surface such as a filmstrip 22. Referring also to FIG. 2 the diaphragm vane may be formed as a disk pivoted centrally on a shaft 16 and having a tapered, curved aperture 18, which moves in a path crossing the lens axis 10 for establishing an exposure aperture whose area is a function of the angular position of the diaphragm vane. The diaphragm vane may be positioned automatically, in a manner well known in the art, by means of a galvanometer coil 24, which is connected to and rotates the diaphragm shaft 16. Coil 24 cooperates with a permanent magnet core 26 and is connected by leads 28 and 30 to a photocell 32, which is exposed to scene light. Variations in scene brightness cause the coil 24 to be variably energized by photocell 32 and thereby cause the coil to move angularly about shaft 16 for establishing an angular position of the diaphragm vane 14 corresponding to scene brightness. The structure and operation of the galvanometer and photocell are well known in the art and may be of the type disclosed in U.S. Patent 2,509,893, granted May 30, 1959, to C. F. Taylor et al.

Although the drawings illustrate a camera wherein the exposure is automatically controlled by positioning a diaphragm vane, it will be understood that the invention has equal utility in conjunction with other forms of automatic exposure control, e.g., in cameras wherein shutter speed is automatically controlled instead of or in addition to diaphragm opening.

Referring to FIG. 2, the diaphragm vane 14 or other automatically positioned exposure control member is formed of electrically conductive material or has a periphery formed of such material. The electrically conducting member may be separate from the automatically positioned exposure control member but geared to it or otherwise moving with this member in timed relation. The conductive surface is continuous except for an insulation segment 34 inset therein. The conducting member cooperates with a pair of conducting rollers 36 and 38, pivoted at 37 and 39, respectively. Rollers 36 and 38 normally are in electrical series with each other through the surface of the conducting member such as vane 14, and are further in series with a circuit comprising a source of electrical potential such as a battery 40, the electric drive motor 42 for the camera and a camera operating switch 44. Motor 42 may be used to operate the usual shutter and film drive mechanisms of the camera in a manner well known in the art. When switch 44 is closed during normal conditions of scene light, a circuit is completed from battery 40 through roller 36, vane 14, roller 38, switch 44 and motor 42, thereby energizing the motor for operating the camera. However, when scene brightness drops below a predetermined level, corresponding to the alignment of the maximum width of aperture 18 with the taking-lens 12, the insulation segment 34 moves under one of the rollers to interrupt the motor circuit and thereby stop further camera operation.

Under some circumstances it may be desirable to continue operation of the camera motor even though scene brightness has dropped below the level of ordinary photographic acceptability. In such cases, a switch 46, which is in parallel with the conducting surface of vane 14 between contact rollers 36 and 38, may be closed in addition to the camera operating switch 44, thereby completing the motor circuit even though one of the rollers overlies the insulation segment 34. Alternatively, a single shunting switch 48 may be closed for closing the motor circuit directly in series with battery 40 and bypassing both the normal motor switch 44 and rollers 36 and 38.

The invention has been described in detail with particular reference to preferred embodiments thereof, but it will be understood that variations and modifications can be effected within the spirit and scope of the invention as described hereinabove and as defined in the appended claims.

I claim:

1. In a camera having an electric drive motor for transporting film, a source of electrical potential for said motor, and an automatic exposure control system including a member movable as a function of scene brightness to regulate the exposure of said film, the combination comprising: means for selectively completing an electrical circuit including said source and said motor to thereby energize said motor; and means controlled by said movable member of the exposure control system for interrupting said circuit in response to the movement of said member to a predetermined position.

2. The combination defined in claim 1, with: selectively operable means for electrically bypassing said interrupting means to energize said motor regardless of the position of said moving member.

3. The combination defined in claim 1, wherein said moving member has a periphery formed generally of electrically conductive material and having an insulation segment inset therein, with: a pair of fixed electrical contacts disposed in adjacent contacting relation to the periphery of said member and connected in said circuit in series with said motor and said source.

4. The combination defined in claim 3, wherein said moving member comprises a diaphragm vane.

5. The combination defined in claim 3, with: a normally open, manually operable switch connected in parallel with the circuit comprising said electrical contacts and said moving member.

6. The combination defined in claim 3, with: a normally open, manually operable switch connected in parallel with the circuit comprising said motor and said source.

References Cited in the file of this patent
UNITED STATES PATENTS

| | | |
|---|---|---|
| 1,935,327 | Morsbach et al. | Nov. 14, 1933 |
| 2,166,147 | Heinsch et al. | July 18, 1939 |
| 2,282,659 | Kun | May 12, 1942 |
| 2,518,717 | Rath | Aug. 15, 1950 |
| 2,780,971 | Fahlenberg | Feb. 12, 1957 |
| 2,841,064 | Bagby et al. | July 1, 1958 |
| 2,906,187 | Dotson | Sept. 29, 1959 |